United States Patent [19]

Sawamura

[11] 4,407,735
[45] Oct. 4, 1983

[54] METHOD OF IMPREGNATING SPHERES OF ACTIVATED ALUMINA FOR USE IN CATALYST SUPPORT WITH CERIUM

[75] Inventor: Keiichi Sawamura, Yokosuka, Japan

[73] Assignee: Nissan Motor Company, Limited, Yokohama, Japan

[21] Appl. No.: 382,282

[22] Filed: May 26, 1982

[30] Foreign Application Priority Data

Jun. 19, 1981 [JP] Japan .................................. 56-93734

[51] Int. Cl.$^3$ .......................... B01J 23/10; B01J 37/00
[52] U.S. Cl. ...................................... 502/10; 502/304; 423/213.5
[58] Field of Search .............................. 252/448, 462; 423/213.5

[56] References Cited

U.S. PATENT DOCUMENTS 4,206,087 6/1980 Keith et al. ......................... 252/462

FOREIGN PATENT DOCUMENTS 2412230 9/1975 Fed. Rep. of Germany .

Primary Examiner—W. J. Shine
Attorney, Agent, or Firm—Schwartz, Jeffery, Schwaab, Mack, Blumenthal & Koch

[57] ABSTRACT

A method of impregnating spheres of activated alumina with cerium in an oxidized state. The cerium-impregnated alumina spheres are for use in catalyst supports for three-way catalysts for purification of exhaust gases of automotive engines. The method has the steps of wetting spheres of activated alumina with an aqueous solution of a cerium salt, drying the wet spheres and calcining the dried spheres in an oxidizing atmosphere. The drying is performed so as to complete the removal of water from the spheres by evaporation in a time period not longer than 10 min, preferably by subjecting the wet spheres to microwave heating and most preferably by performing the microwave heating with a forced draft. By quickly completing the drying the distribution of cerium in the individual spheres becomes very uniform, and this has the effect of improving the efficiency of three-way catalysts produced by using the cerium-impregnated spheres of activated alumina.

8 Claims, 4 Drawing Figures

METHOD OF IMPREGNATING SPHERES OF ACTIVATED ALUMINA FOR USE IN CATALYST SUPPORT WITH CERIUM

BACKGROUND OF THE INVENTION

This invention relates to a method of impregnating spheres of activated alumina with cerium, the spheres being useful in catalyst supports and particularly in supports for so-called three-way catalyst for the purification of exhaust gases of internal combustion engines.

As a practically advantageous means for purifying exhaust gases discharged from automotive internal combustion engines, a great interest has been attached to so-called three-way catalysts which can accomplish both the oxidation of carbon monoxide (CO) and hydrocarbons (HC) and the reduction of nitrogen oxides (NOx) simultaneously. Usually a three-way catalyst contains a plurality of metals of the platinum group, such as platinum and rhodium, as catalytic elements which are supported on a carrier or support in the form of either spheres or a monolithic body of honeycomb structure.

In practice, a three-way catalyst is desired to have a window width as wide as possible. The term "window width" refers to a range of the composition of the exhaust gas, in which the catalyst exhibits a satisfactorily high conversion value (e.g. at least 80%) for every one of CO, HC and NOx. In this regard, it is known that the presence of cerium oxide or ceria which has an oxygen-storage function in a three-way catalyst is effective for expansion of the window width. In producing a three-way catalyst based on this knowledge, it is usual to prepare a catalyst support by utilizing small spheres of activated alumina impregnated with cerium in an oxidized state. Such alumina spheres are prepared through the steps of wetting spheres of activated alumina with an aqueous solution of a cerium salt, drying the wet spheres in a hot-air oven, and calcining the dried spheres in air. For example, a monolithic catalyst support is coated with cerium-containing activated alumina by first pulverizing the cerium-impregnated spheres of activated alumina in a suitable liquid to obtain a coating liquid, then wetting a conventional monolithic support with this coating liquid, followed by drying, and calcining the dried monolithic support. A three-way catalyst is produced by applying catalytic elements onto the surfaces of the thus coated monolithic support by a known method.

Certainly, three-way catalysts obtained by utilizing cerium-impregnated spheres of activated alumina are featuring relatively large values of the window width, but still there is a demand for further expansion of the window width of three-way catalysts.

SUMMARY OF THE INVENTION

It is an object of the present invention to provide an improved method of impregnating spheres of activated alumina for use in catalyst supports with cerium in an oxidized state, the product of which method features very uniform distribution of cerium in the individual spheres of activated alumina and therefore, when used in a three-way catalyst, has the effect of expanding the window width of the catalyst.

A method according to the invention has the steps of wetting spheres of activated alumina with an aqueous solution of a cerium salt, drying the wet spheres and calcining the dried spheres in an oxidizing atmosphere, and the improvement according to the invention resides in that the step of drying the wet spheres is performed so as to complete the removal of water from the spheres by evaporation in a time period not longer than 10 minutes.

As the basis of this invention, the inventor of the present application has discovered that the effect of ceria in a three-way catalyst produced by using cerium-impregnated spheres of activated alumina as a support material depends on the degree of uniformity of the distribution of cerium in the individual spheres of activated alumina, and that the degree of uniformity of the distribution of cerium can be enhanced by quickly completing the drying of the spheres wetted with an aqueous solution of a cerium salt, with the effect of expanding the window width of a three-way catalyst which utilizes the cerium-impregnated spheres of activated alumina obtained through a calcining step subsequent to the quick drying.

In the present invention, it is preferred to perform the aforementioned drying step by subjecting the wet spheres of activated alumina to direct heating by microwaves. More preferably, the microwave heating of the wet spheres is performed in a current of air.

In conventional methods of impregnating spheres of activated alumina with cerium, drying of the spheres wetted with an aqueous solution of a cerium salt is performed by using hot air in an oven of the hot-air circulation type, a rotary drier or a vibration drier. In these methods, it takes a considerably long time, i.e. at least 30 min, to practically completely evaporate water contained in the wet spheres irrespective of the type of the oven or drier.

During the drying process in the conventional methods, evaporation of water occurs mainly at the outer surface of each sphere of activated alumina, which is microscopically porous as is well known, and water present in the interior spaces of the porous sphere gradually moves toward the sphere surface by reason of capillarity. Such movement of water in each sphere is accompanied by gradual movement of the cerium salt dissolved in the water. The rate of movement of the dissolved cerium salt augments as the rate of movement of water toward the sphere surface is lower and, hence, as the drying process consumes a larger amount of time.

Before the drying process, the distribution of the cerium salt dissolved in water in each sphere of activated alumina is fairly uniform, but after completion of the conventional drying process which takes a considerably long time the cerium salt is no longer uniformly distributed in the sphere because of its movement from the interior of the sphere toward the outer surface during the drying process. Therefore, even when the cerium-impregnated sphere of activated alumina are used in pulverized form as a coating material for a monolithic support of a three-way catalyst, the distribution of cerium oxide in the coating layer does not become truly uniform, so that the three-way catalyst fails to afford full satisfaction to the users in regard of its effectiveness represented by the value of the window width.

In the method according to the invention the drying of the wet spheres of activated alumina is completed in a very short time with the intention of avoiding the cerium salt in each sphere moving to concentrate in an outer surface region of the sphere during the drying process. It has been experimentally confirmed that this intention can fully be realized. That is, in cerium-impregnated spheres of activated alumina obtained by this method cerium is very uniformly distributed throughout each sphere from a central region of the sphere to the outer surface. Also it has been confirmed that three-way catalysts produced by using cerium-impregnated spheres of activated alumina prepared by the method according to the invention exhibit improved conversion abilities in exhaust gases of internal combustion engines.

DESCRIPTION OF THE PREFERRED EMBODIMENTS

In a method according to the invention the initial step of wetting spheres of activated alumina with an aqueous solution of a cerium salt is performed in a conventionally employed way by using commercially available spheres of activated alumina. The term spheres should not strictly be construed but should be construed as to include granules which are not literally spherical. Cerium nitrate is a typical example of useful cerium salts. The concentration of the cerium salt solution and the quantity of the solution relative to the quantity of the alumina spheres are determined in accordance with the desired content of cerium in the cerium-impregnated spheres of activated alumina obtained upon completion of the subsequent calcining step, and preferably such that the content of cerium falls in the range from 2 to 15% of the total weight of the cerium-impregnated spheres after calcining.

The next step of drying the alumina spheres wetted with the cerium salt solution must be so performed as to practically complete the removal of water from the spheres by evaporation in a time period not longer than 10 min with a view to minimizing the movement of the cerium salt in the individual spheres during removal of water. As will be understood from the explanation given hereinbefore, it is desirable to complete the drying as quickly as possible. In the present invention it is especially preferred to dry the wet alumina spheres by directly exposing the wet spheres to microwaves of which frequencies are of the order of $2 \times 10^3$ MHz, because in the spheres subjected to microwave heating a fraction of water adhering to the outer surface of each sphere and the remaining fractions of water retained in the interior of the sphere are heated simultaneously and uniformly.

Figure 1:
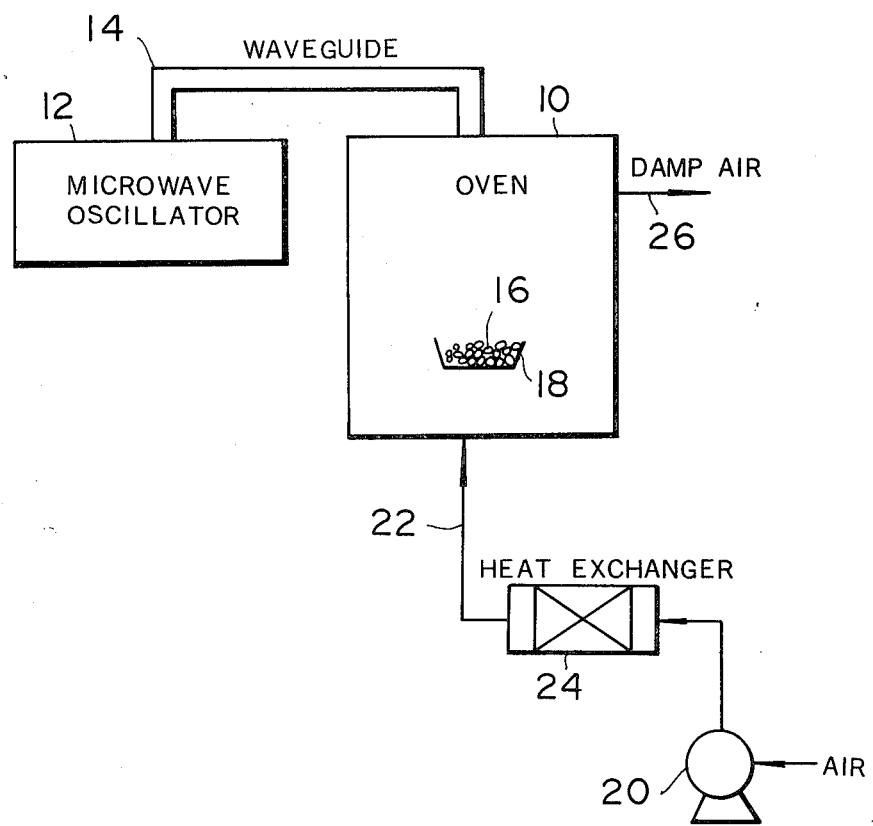
FIG. 1 is a diagram showing a drying apparatus preferred in the present invention.

More preferably, the microwave heating of the wet spheres is performed with a forced draft, meaning that the wet spheres under microwave heating are placed in a current of air, because this is quite effective for quick dissipation of the evaporated water and accordingly for enhancement of the rate of drying. In this case it is desirable to use hot air having a temperature of about 30° C. to about 120° C. FIG. 1 illustrates a drying apparatus suited to this method. Indicated at 10 is a microwave oven to which microwaves are transmitted from a microwave oscillator 12 having a magnetron through a waveguide 14. At the start of the drying step, wet alumina spheres 16 are placed in the microwave oven 10 in a state put into an open-top vessel 18 made of a ceramic material. During operation of the heating apparatus 10 and 12, air is continuously supplied to the microwave oven 10 from a blower 20 through pipe 22 via a heater or a heat exchanger 24, and moistened air is continuously discharged from the oven 10 through a duct 26.

After completion of the drying step, the alumina spheres impregnated with the cerium salt are calcined in an oxidizing atmosphere, usually in air, at a temperature lower than the melting point of cerium but high enough to cause complete decomposition of the cerium salt. As is common in conventional methods, a suitable range of the calcining temperature is from about 500° C. to about 650° C.

Cerium-impregnated spheres of activated alumina obtained by a method according to the invention are useful as a support material for known three-way catalysts. As mentioned hereinbefore, the alumina spheres will be used in a pulverized form as a coating material for monolithic catalyst supports, but it is also possible to use the spheres directly as catalyst supports in producing three-way catalysts in the form of spheres.

The following examples illustrate the method according to the invention.

EXAMPLE 1

As the source of cerium, 462 g of cerium nitrate hexahydrate $Ce(NO_3)_3.6H_2O$ was dissolved in 400 ml of water. In a 2-liter polyethylene beaker, 1140 g of activated alumina spheres (2–4 mm in diameter, SCS-79 of Rhone-Poulenc S.A. of France) were well mixed with the aqueous solution of cerium nitrate to uniformly impregnate the alumina spheres with the solution. An almost entire quantity of the solution was absorbed in the alumina spheres, but about 10 ml of the solution remained unabsorbed. This portion of the solution was drained away from the alumina spheres by using a polyethylene net.

After the draining, the alumina spheres impregnated with the cerium nitrate solution were divided into four equal portions, and each portion was dried in a microwave oven as illustrated in FIG. 1 under the following drying conditions.

Frequency of Microwaves: 2450±50 MHz
Electric Power: 4 KW
Temperature of Hot Air: 100±5° C.
Flow Rate of Hot Air: 100 liters per minute
Drying Time: 1.0 min The dried alumina spheres were calcined in air at 600° C. for 2 hr to thereby decompose cerium nitrate in the spheres. The cerium-impregnated activated alumina spheres obtained by this process will be referred to as Sample A.

Additionally, Samples B to H of cerium-impregnated activated alumina spheres were produced generally by the above described process but by varying the drying conditions as shown in the following Table 1.

TABLE 1

| | Electric Power (KW) | Temperature of Hot Air (°C.) | Drying Time (min) |
|---|---|---|---|
| Sample A | 4 | 100 ± 5 | 1.0 |
| Sample B | 2 | 100 ± 5 | 2.0 |
| Sample C | 1 | 100 ± 5 | 3.0 |
| Sample D | 4 | 30 | 1.5 |
| Sample E | 2 | 30 | 2.5 |
| Sample F | 1 | 30 | 3.5 |
| Sample G | 0.8 | 30 | 5.0 |
| Sample H | 0.6 | 30 | 10.0 |

In every one of these Samples A to H, the content of cerium was 10% of the total weight of the spheres after calcining.

Figure 2:
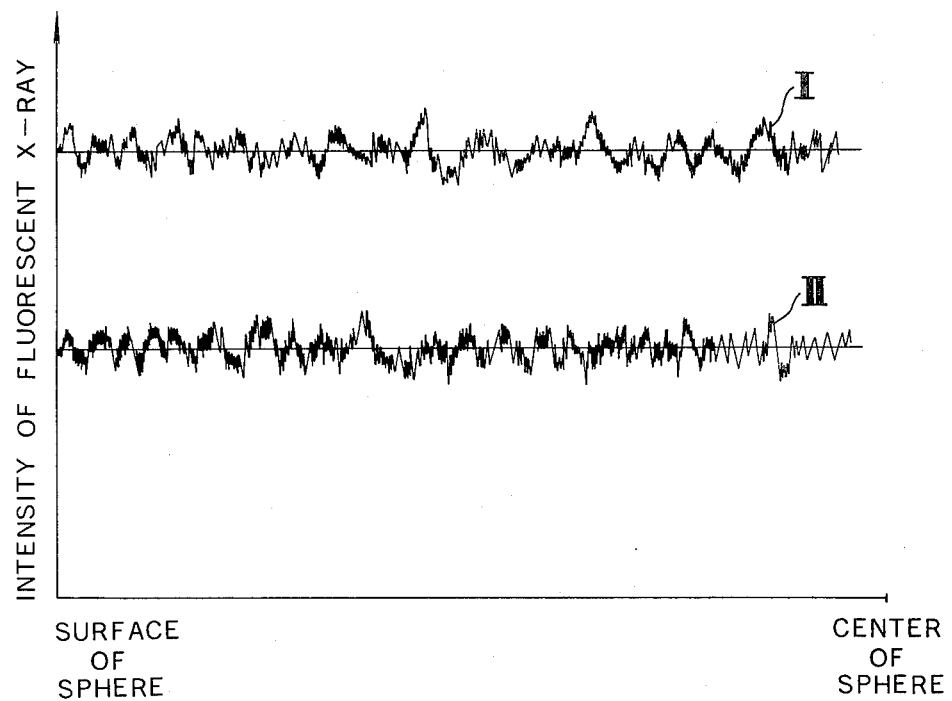
FIG. 2 contains two charts each showing the result of an X-ray analysis of the manner of distribution of cerium in a sphere of activated alumina treated by a method according to the invention.

With respect to each of these Samples A to H, the manner of distribution of cerium in the spheres of activated alumina was examined by using an X-ray microanalyser, and it was revealed that there was practically no difference among these Samples A to H. In FIG. 2, the chart I represents the relationship between the depth from the outer surface of a single sphere of these Samples and the intensity of the fluorescent X-ray characteristic of cerium. Certainly this chart I indicates that cerium was uniformly distributed throughout this sphere from its outer surface to its center.

EXAMPLE 2

Sample J of cerium-impregnated activated alumina spheres was produced by the process and under the drying conditions described in Example 1 with respect to Sample A, except that the quantity of the activated alumina spheres (SCS-79) was increased to 1220 g and that use was made of a solution obtained by dissolving 231 g of cerium nitrate hexahydrate in 500 ml of water.

Additionally, Samples K to O of cerium-impregnated activated alumina spheres were produced generally by the same process but by varying the drying conditions in the microwave oven as shown in the following Table 2.

TABLE 2

| | Electric Power (KW) | Temperature of Hot Air (°C.) | Drying Time (min) |
|---|---|---|---|
| Sample J | 4 | 100 ± 5 | 1.0 |
| Sample K | 2 | 100 ± 5 | 2.0 |
| Sample L | 1 | 100 ± 5 | 3.0 |
| Sample M | 4 | 30 | 1.5 |
| Sample N | 2 | 30 | 2.5 |
| Sample O | 1 | 30 | 3.5 |

In every one of these Samples J to O, the content of cerium was 5% of the total weight of the spheres after calcining.

The manner of distribution of cerium in the activated alumina spheres of these Samples J to O was examined by the X-ray microanalyser, and it was revealed that there was practically no difference among these Samples J to O. In FIG. 2, the chart II represents the manner of distribution of the intensity of the fluorescent X-ray characteristic of cerium in a single sphere of these Samples. Also this chart II indicates that cerium was uniformly distributed throughout this sphere from its outer surface to its center.

REFERENCE 1

Cerium-impregnated spheres of activated alumina were produced by using the same materials and the same process as in Example 1, but in this case the drying conditions in the microwave oven were as follows.

Frequency of Microwaves: 2450±50 MHz
Electric Power: 0.4 KW
Temperature of Hot Air: 30° C.
Flow Rate of Hot Air: 100 liters per minute
Drying Time: 15 min In this case it was necessary to extend the drying time to 15 min to achieve thorough drying due to a great lowering in the electric power for the microwave heating. The cerium-impregnated alumina spheres obtained through the subsequent calcining process as described in Example 1 will be referred to as Sample S. In this Sample S, the content of cerium was 10% of the total weight of the spheres after calcining.

Figure 3:
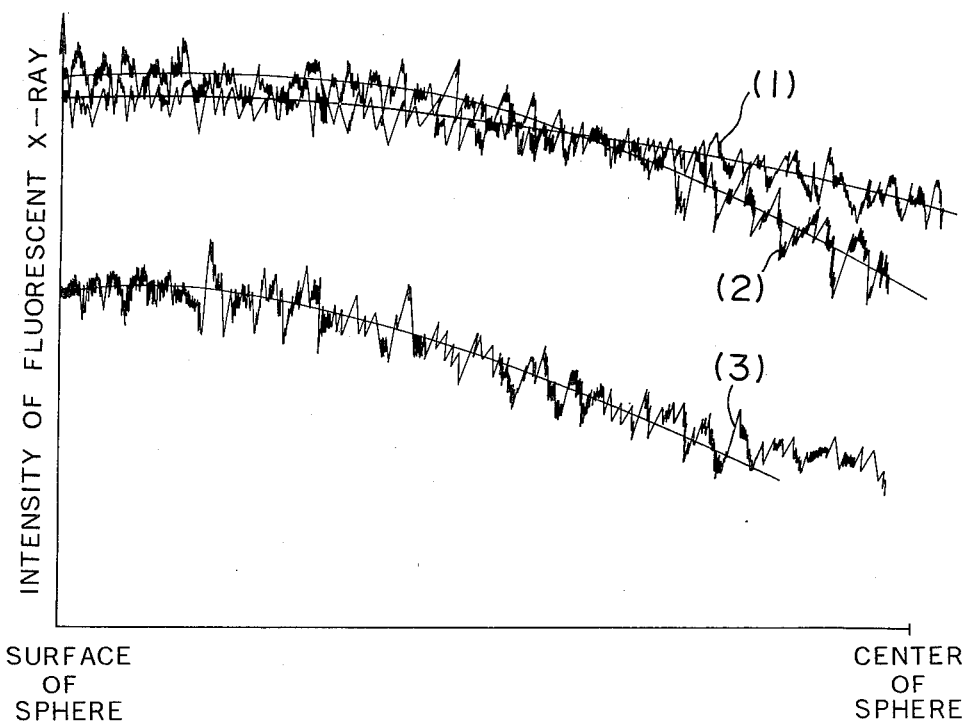
FIG. 3 contains three charts each showing the result of an X-ray analysis of the manner of distribution of cerium in a sphere of activated alumina treated by a conventional method.

The manner of distribution of cerium in the individual spheres of this Sample S was examined by the X-ray microanalyser, and the result was as represented by the chart (1) in FIG. 3. This chart (1) clearly indicates that the distribution of cerium in this sphere was nonuniform and that the concentration of cerium was highest on the outer surface of the sphere and gradually lowered as the depth from the surface increased.

REFERENCE 2

Cerium-impregnated spheres of activated alumina were produced generally in accordance with Example 1 except that drying of the spheres impregnated with the cerium nitrate solution was performed in an oven of the hot air circulation type in which the temperature of the hot air was 120° C. It took 120 min to thoroughly dry each of the four equally divided portions of the wet spheres. The cerium-impregnated alumina spheres obtained through the subsequent calcining process will be referred to as Sample P. In this Sample P, the content of cerium was 10% of the total weight of the spheres after calcining.

The manner of distribution of cerium in the individual spheres of this Sample P was examined by the X-ray microanalyser, and the result was as represented by the chart (2) in FIG. 3. It is apparent that the distribution of cerium in this sphere was nonuniform in a similar manner as in the spheres of Sample S of Reference 1.

REFERENCE 3

Cerium-activated spheres of activated alumina were produced generally in accordance with Example 2 except that drying of the wet spheres was performed in accordance with Reference 2. The cerium-impregnated alumina spheres produced in this way will be referred to as Sample Q. In this Sample Q, the content of cerium was 5% of the total weight of the spheres after calcining.

In FIG. 3, the chart (3) represents the manner of distribution of cerium in the individual spheres of Sample Q examined by the X-ray microanalyser. It is understood that the distribution of cerium in this sphere was nonuniform such that the concentration of cerium was highest on the outer surface of the sphere and gradually lowered toward the center of the sphere.

REFERENCE 4

Cerium-impregnated spheres of activated alumina were produced generally in accordance with Example 1 except that drying of the wet spheres was performed by using a small-sized hot air blower (a hair drier). The temperature of the hot air blown against the spheres was 120° C., and it took 30 min to thoroughly dry each of the for equally divided portions of the wet spheres. The cerium-impregnated alumina spheres produced in this way will be referred to as Sample R. In this Sample R, the content of cerium was 10% of the total weight of the spheres after calcining.

The manner of distribution of cerium in the individual spheres of Sample R was examined by the X-ray microanalyser, and it was revealed that there was practically no difference between Sample P of Reference 2 and Sample R of Reference 4. That is, the manner of distribution of cerium in each sphere of Sample R was as represented by the chart (2) of FIG. 3.

COMPARATIVE EXPERIMENT

In this experiment, eighteen kinds of three-way catalysts of monolithic form were produced by using the eighteen kinds of cerium-impregnated activated alumina spheres of Examples 1 and 2 and References 1 to 4, respectively.

Each of Samples A to O and Samples S, P, Q and R was used to prepare a coating liquid by mixing 1300 g of the cerium-impregnated activated alumina spheres with 260 g of a boehmite gel, 200 g of 10 wt % aqueous solution of hydrochloric acid and 2340 g of water and pulverizing the spheres in the mixture in a ball mill which was operated for 10 hr at a constant rate of 80 rpm.

Next, a commercially available monolithic catalyst support formed of cordierite was coated with the coating liquid. The monolithic support was elliptical in cross sectional shape and 81 mm in shorter diameter, 170 mm in longer diameter and 144 mm in length, and had a honeycomb structure with 400 cells per square inch. The excess amount of the coating liquid was dissipated by air-blowing, and the wet support was dried in an oven. After drying, the support was calcined in air at 600° C. for 2 hr. By this process, the cordierite support was coated with activated alumina which had been impregnated with cerium.

The thus coated support was immersed in an aqueous solution of chloroplatinic acid and rhodium chloride, withdrawn from the solution, dried and thereafter calcined at 550° C. for 2 hr to obtain a three-way catalyst of monolithic form. The concentrations of chloroplatinic acid and rhodium chloride in the solution were such that the total amount of platinum and rhodium in this catalyst was 35 g/ft$^3$ and that the weight ratio of platinum to rhodium was 10:1.

Figure 4:
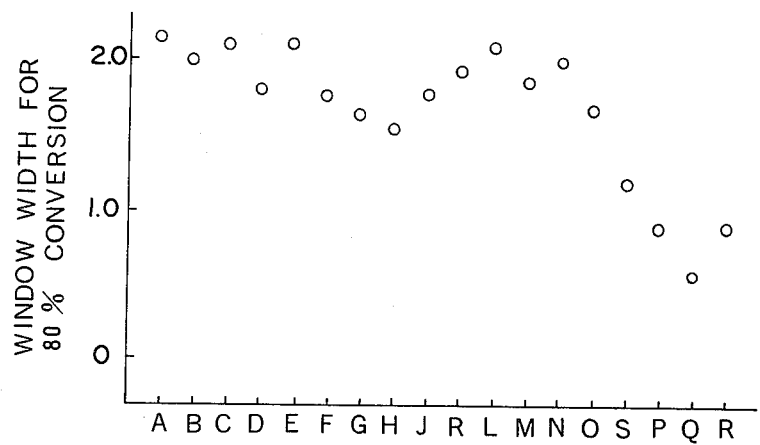
FIG. 4 is a chart showing window width values of three-way catalysts produced by utilizing a method according to the invention and comparative three-way catalysts produced by conventional methods.

The eighteen kinds of catalysts produced by using the eighteen kinds of cerium-impregnated alumina spheres samples, respectively, were subjected to an endurance test. In this test, a V-type 8-cylinder 4.4-liter automotive gasoline engine was operated under such conditions as correspond to the running of the car at 100 km/hr by intermittently injecting fuel into the engine each time for 60 sec at regular intervals of 5 sec. Each of the monolithic three-way catalysts was exposed to the exhaust gas discharged from the engine for 100 hr, while the exhaust gas temperature at the location of the catalyst was adjusted to 800° C. After completion of this endurance test, the catalytic ability of each catalyst was measured in terms of conversions for CO, HC and NOx contained in exhaust gases of a gasoline engine operated under bench test conditions at various air/fuel ratio values. In FIG. 4, the characters on the abscissa represent the cerium-impregnated alumina spheres Samples A to H, S, P, Q and R used in the respective catalysts subjected to the test and measurement, and the catalytic ability of each catalyst is represented by the window-width for 80% conversions of CO, HC and NOx at an exhaust gas temperature of 450° C. As can be seen in FIG. 4, the catalysts produced by using the cerium-impregnated activated alumina spheres treated in Examples of the present invention were all excellent in the catalytic ability after the endurance test. Considering that cerium was very uniformly distributed in the individual spheres of activated alumina treated in accordance with the invention, a probable reason for the enlarged window-width values is that the oxidized cerium in the coating on each monolithic catalyst support contacted with the exhaust gases with considerably enhanced efficiency.

What is claimed is:

1. In a method of impregnating spheres of activated alumina for use in catalyst supports with cerium in an oxidized state, the method having the steps of wetting spheres of activated alumina with an aqueous solution of a cerium salt, drying the wet spheres and calcining the dried spheres in an oxidizing atmosphere, the improvement comprising performing the step of drying the wet spheres so as to complete the removal of water from the spheres by evaporation in a time period not longer than 10 minutes.

2. A method according to claim 1, wherein the step of drying the wet spheres is performed by exposing the wet spheres to microwaves.

3. A method according to claim 2, wherein the wet spheres are placed in a current of air during the drying step.

4. A method according to claim 3, wherein the temperature of said current of air is in the range from about 30° C. to about 120° C.

5. A method according to claim 1 or 3, wherein said oxidizing atmosphere at the calcining step is air.

6. A method according to claim 1 or 3, wherein the dried spheres are calcined at a temperature in the range from about 500° C. to about 650° C.

7. A method according to claim 1 or 3, wherein the concentration of said cerium salt in said aqueous solution and the quantity of said aqueous solution relative to the quantity of the spheres of activated alumina are controlled such that the content of cerium in the spheres after the calcining step is in the range from 2 to 15% of the total weight of the spheres after the calcining step.

8. A method according to claim 1 or 3, wherein said cerium salt is cerium nitrate.

* * * * *